United States Patent
Shi et al.

(10) Patent No.: US 9,733,445 B2
(45) Date of Patent: Aug. 15, 2017

(54) ACCESS TERMINAL BOX

(71) Applicant: Huawei Technologies Co., Ltd., Shenzhen (CN)

(72) Inventors: Deyi Shi, Shenzhen (CN); Yeren Wang, Shenzhen (CN); Anliang Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/147,687

(22) Filed: May 5, 2016

(65) Prior Publication Data
US 2016/0327767 A1 Nov. 10, 2016

Related U.S. Application Data

(63) Continuation of application No. PCT/CN2015/078551, filed on May 8, 2015.

(51) Int. Cl.
*G02B 6/00* (2006.01)
*G02B 6/44* (2006.01)

(52) U.S. Cl.
CPC .......... *G02B 6/4446* (2013.01); *G02B 6/445* (2013.01)

(58) Field of Classification Search
CPC ... G02B 6/4439; G02B 6/4452–6/4454; G02B 6/4446; G02B 6/445; G02B 6/4457
USPC ................................. 385/134, 135
See application file for complete search history.

(56) References Cited

U.S. PATENT DOCUMENTS

| | | | |
|---|---|---|---|
| 9,188,760 B2 * | 11/2015 | Kowalczyk | G02B 6/4457 |
| 2009/0304342 A1 | 12/2009 | Adomeit et al. | |
| 2010/0202746 A1 | 8/2010 | Sokolowski et al. | |
| 2013/0343716 A1 | 12/2013 | Kwon et al. | |
| 2016/0018617 A1 * | 1/2016 | Loeffelholz | G02B 6/4441 |
| | | | 385/135 |

FOREIGN PATENT DOCUMENTS

| | | |
|---|---|---|
| CN | 101825750 A | 9/2010 |
| CN | 101840039 A | 9/2010 |
| CN | 201837753 U | 5/2011 |
| CN | 102692689 A | 9/2012 |
| CN | 202904081 U | 4/2013 |
| CN | 103926667 A | 7/2014 |

(Continued)

OTHER PUBLICATIONS

Partial English Translation and Abstract of Chinese Patent Application No. CN202904081, Mar. 14, 2016, 4 pages.

(Continued)

*Primary Examiner* — Robert Tavlykaev
(74) *Attorney, Agent, or Firm* — Conley Rose, P.C.

(57) ABSTRACT

An access terminal box pertaining to the field of communications technologies. The access terminal box includes a protective cover, a base, an adapter, a fastening plate, and a base plate, where the base is fastened on the base plate, the fastening plate is fastened on the base, the protective cover is fastened on the base and covers the fastening plate, a fastening slot is disposed on the fastening plate, and the adapter is fastened inside the fastening slot. The fastening plate is disposed, and the adapter is separately mounted on the fastening plate, such that space of the base is more compact, and a volume of the access terminal box is reduced.

11 Claims, 9 Drawing Sheets

(56) References Cited

FOREIGN PATENT DOCUMENTS

| EP | 1852722 A2 | 11/2007 |
| EP | 2674800 A2 | 12/2013 |
| WO | 2012138856 A1 | 10/2012 |
| WO | 2014096134 A1 | 6/2014 |

OTHER PUBLICATIONS

Foreign Communication From a Counterpart Application, PCT Application No. PCT/CN2015/078551, International Search Report dated Feb. 15, 2016, 8 pages.
Foreign Communication From a Counterpart Application, PCT Application No. PCT/CN2015/078551, Written Opinion fated Feb. 15, 2016, 5 pages.
Foreign Communication From A Counterpart Application, European Application No. 15805375.1, Extended European Search Report dated Feb. 15, 2017, 9 pages.

\* cited by examiner

ACCESS TERMINAL BOX

CROSS REFERENCE

This application is a continuation of International Application No. PCT/CN2015/078551, filed on May 8, 2015, which is hereby incorporated by reference in its entirety.

TECHNICAL FIELD

The present disclosure relates to the field of communications technologies, and in particular, to an access terminal box.

BACKGROUND

Because fiber optic communications has advantages such as a large capacity, a long distance, and anti-electromagnetic interference, the fiber optic communications better caters to people's requirements for a large information amount and high precision in the future, and a low price makes a transmission medium of fiber be promoted in a quite large scope. Currently, a fiber network is already gradually being used in home. Mounting of fiber to the home generally includes mounting of an access terminal box (ATB) and mounting of an optical network terminal (ONT). The access terminal box and the optical network terminal are indoor application products of a user on an optical network, and the access terminal box and the optical network terminal are connected using a leading-out optical cable of the access terminal box.

Figure 1:
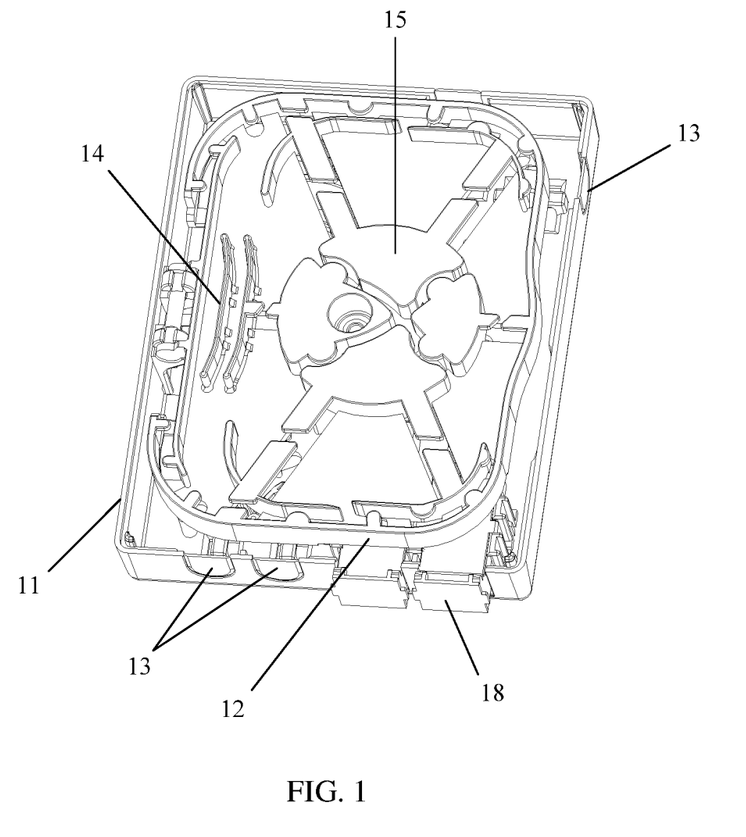
FIG. 1 is a schematic structural diagram of a base and a splicing tray (that are closed) of an access terminal box in the prior art.
Figure 2:
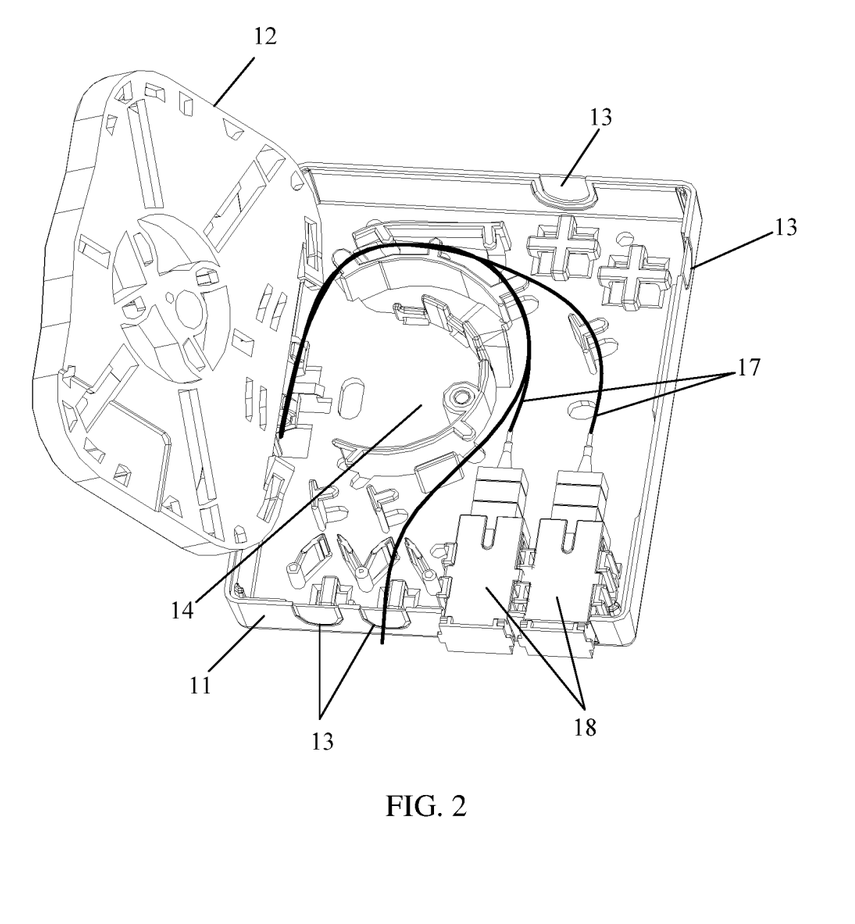
FIG. 2 is a schematic structural diagram of a base and a splicing tray (that are opened) of an access terminal box in the prior art.

An existing access terminal box includes a protective cover, a base, a base plate, and an adapter, where the protective cover is fastened to the base, and the base is fastened to the base plate. As shown in FIG. 1 and FIG. 2, a splicing tray 12 is disposed on a base 11, the splicing tray 12 uses a flipping structure, the splicing tray 12 undertakes a splicing function and a coiling function, and the base 11 undertakes a function of leading in a drop cable and connecting to an adapter 18. After the drop cable is led in through a cable leading-in hole 13, the drop cable passes through a cable leading-in area 14, then enters a coiling area 15 on the splicing tray 12 to be coiled, and then is spliced with a pigtail 17 in a splicing area. After being coiled in the coiling area 15, the pigtail 17 is connected to the adapter 18. Considering a limitation on a smallest bending radius of a fiber, if a four-core Standard Connector (SC) adapter is supported in a width direction of the access terminal box structure shown in FIG. 1 and FIG. 2, a width size is very large, and a size of the cable leading-in area 14 in a width direction is very large, which causes a relatively large volume of the access terminal box.

SUMMARY

Embodiments of the present disclosure provide an access terminal box, where a fastening plate is disposed, and an adapter is separately mounted on the fastening plate, which reduces a volume of the access terminal box.

According to a first aspect, an embodiment of the present disclosure provides an access terminal box, including a protective cover, a base, an adapter, a fastening plate, and a base plate, where the base is fastened on the base plate, the fastening plate is fastened on the base, the protective cover is fastened on the base and covers the fastening plate, a fastening slot is disposed on the fastening plate, and the adapter is fastened inside the fastening slot.

With reference to the first aspect, in a first possible implementation manner of the first aspect, a cable leading-in hole is disposed on the base, an optical cable enters the base through the cable leading-in hole, a fiber separated from the optical cable is coiled inside a first coiling slot disposed on the base and is spliced with one end of a pigtail, the pigtail is coiled inside a second coiling slot disposed on the base, and the other end of the pigtail is connected to the adapter.

With reference to the first aspect, in a second possible implementation manner of the first aspect, the fastening plate is fastened at a top layer of the base, the first coiling slot and the second coiling slot are fastened at a middle layer of the base, and the optical cable enters a bottom layer of the base through the cable leading-in hole.

With reference to the first aspect, in a third possible implementation manner of the first aspect, a fastening shaft is disposed on a side of the fastening plate, a fastening slot for fastening the fastening shaft is correspondingly disposed on the base, and the fastening plate is connected to the base in a movably fastened manner using the fastening slot.

With reference to the first aspect, in a fourth possible implementation manner of the first aspect, a first fastening part is further disposed on the base, a second fastening part is correspondingly disposed on the fastening plate, and when the fastening plate and the base are opened and the fastening plate flips by 180 degrees, the first fastening part is connected to the second fastening part in a fastened manner.

With reference to the first aspect, the first fastening part is a fastener, and the second fastening part is a locking slot; or the first fastening part is a locking slot, and the second fastening part is a fastener.

With reference to the first aspect, in a sixth possible implementation manner of the first aspect, an edge of a side extends to a side wall of the base to form an extension part, where the side is opposite to a side that is of the fastening plate and on which a fastening shaft is disposed, a third fastening part is disposed on an inner side surface of the extension part, a fourth fastening part is correspondingly disposed on a side wall of the base, and when the fastening plate and the base are closed, the third fastening part is connected to the fourth fastening part in a fastened manner.

With reference to the first aspect, in a seventh possible implementation manner of the first aspect, the third fastening part is a fastener, and the fourth fastening part is a locking slot; or the third fastening part is a locking slot, and the fourth fastening part is a fastener.

With reference to the first aspect, in an eighth possible implementation manner of the first aspect, there are two fastening shafts, two fastening slots, two first fastening parts, two second fastening parts, two third fastening parts, and two fourth fastening parts.

With reference to the first aspect, in a ninth possible implementation manner of the first aspect, multiple evenly distributed cable claws are disposed in an area between the fastening shafts of the fastening plate.

It can be seen from the foregoing technical solutions that the embodiments of the present disclosure have the following beneficial effect.

In the embodiments of the present disclosure, a fastening plate is disposed, and an adapter is separately mounted on the fastening plate, such that space of a base is more compact, and a volume of an access terminal box is reduced.

EMBODIMENTS OF THE APPLICATION

To make the objectives, technical solutions, and advantages of the embodiments of the present disclosure clearer, the following clearly describes the technical solutions of the embodiments of the present disclosure with reference to the accompanying drawings in the embodiments of the present disclosure.

Figure 3:
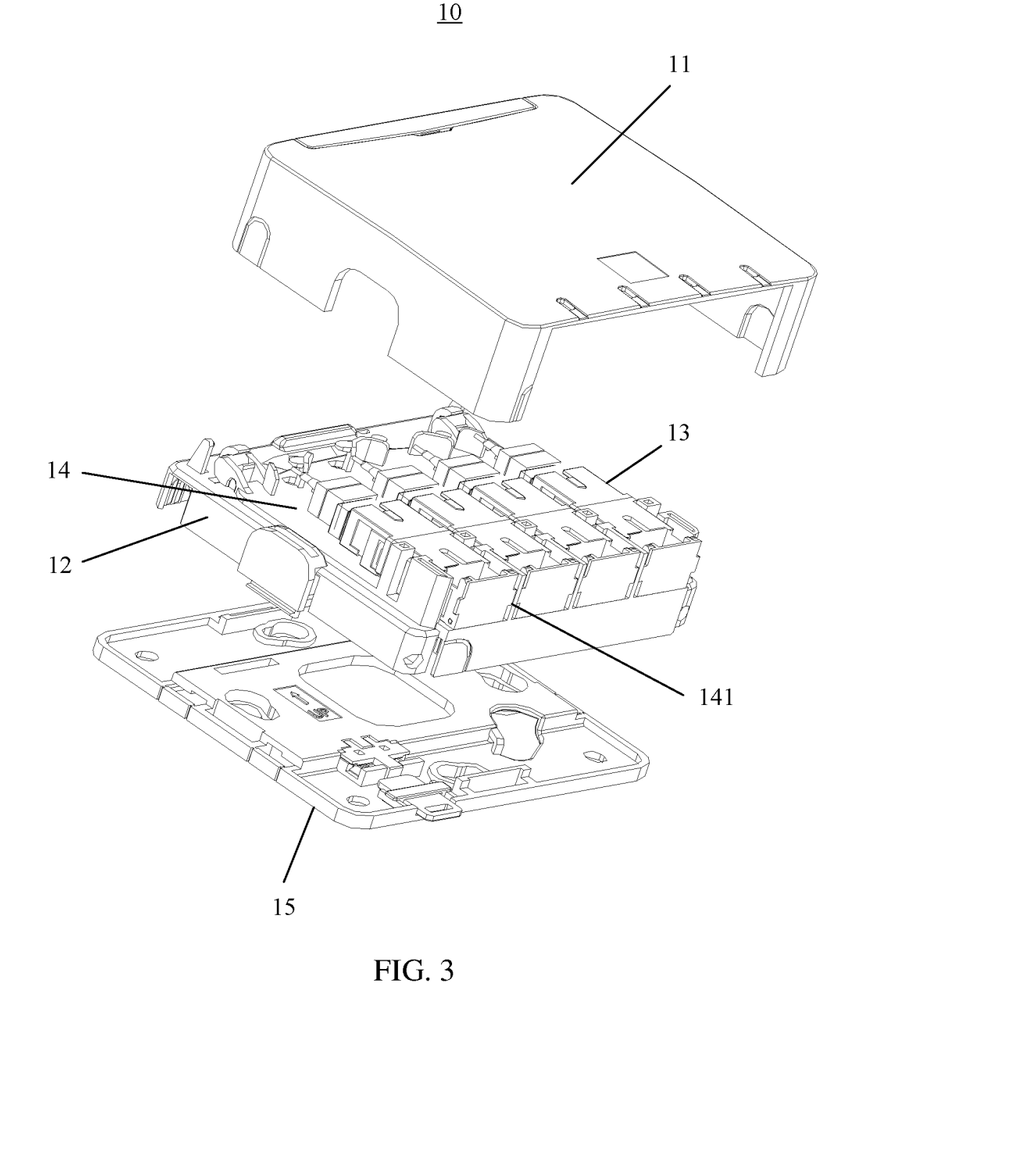
FIG. 3 is a schematic diagram of a three-dimensional structure of an access terminal box according to an embodiment of the present disclosure.

As shown in FIG. 3, FIG. 3 is a three-dimensional exploded view of an access terminal box 10 disclosed in an embodiment of the present disclosure. The access terminal box 10 disclosed in this embodiment of the present disclosure includes a protective cover 11, a base 12, an adapter 13, a fastening plate 14, and a base plate 15. The base 12 is fastened on the base plate 15, the fastening plate 14 is fastened on the base 12, the protective cover 11 is fastened on the base 12 and covers the fastening plate 14, a fastening slot 141 is disposed on the fastening plate 14, and the adapter 13 is fastened inside the fastening slot 141. In this embodiment of the present disclosure, the fastening plate 14 is disposed, and the adapter 13 is separately mounted on the fastening plate 14. However, in the prior art, an adapter is fastened on a base. Therefore, in this embodiment, space of the base 12 is more compact, and a volume of the access terminal box 10 is reduced.

Figure 4:
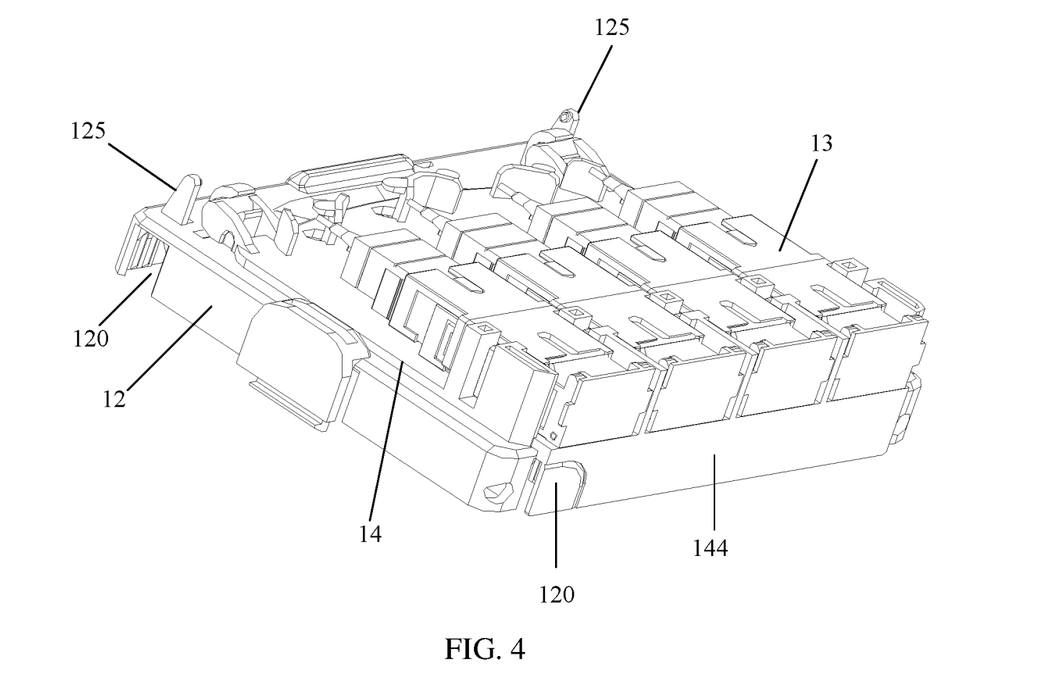
FIG. 4 is a schematic diagram of a three-dimensional structure of a base of the access terminal box shown in FIG. 3.
Figure 7:
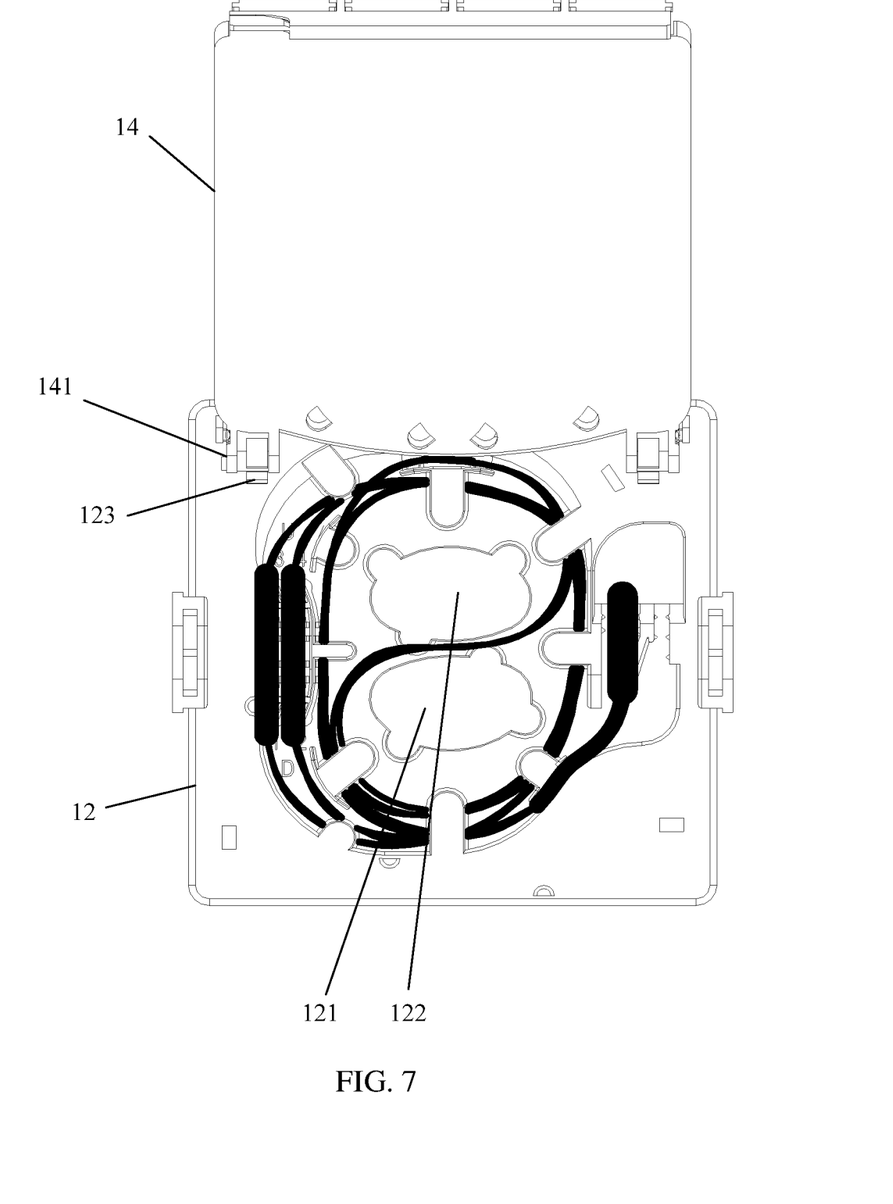
FIG. 7 is a schematic diagram of a three-dimensional structure of a fastening plate and a base (including an optical cable and a fiber) obtained after flipping.
Figure 8:
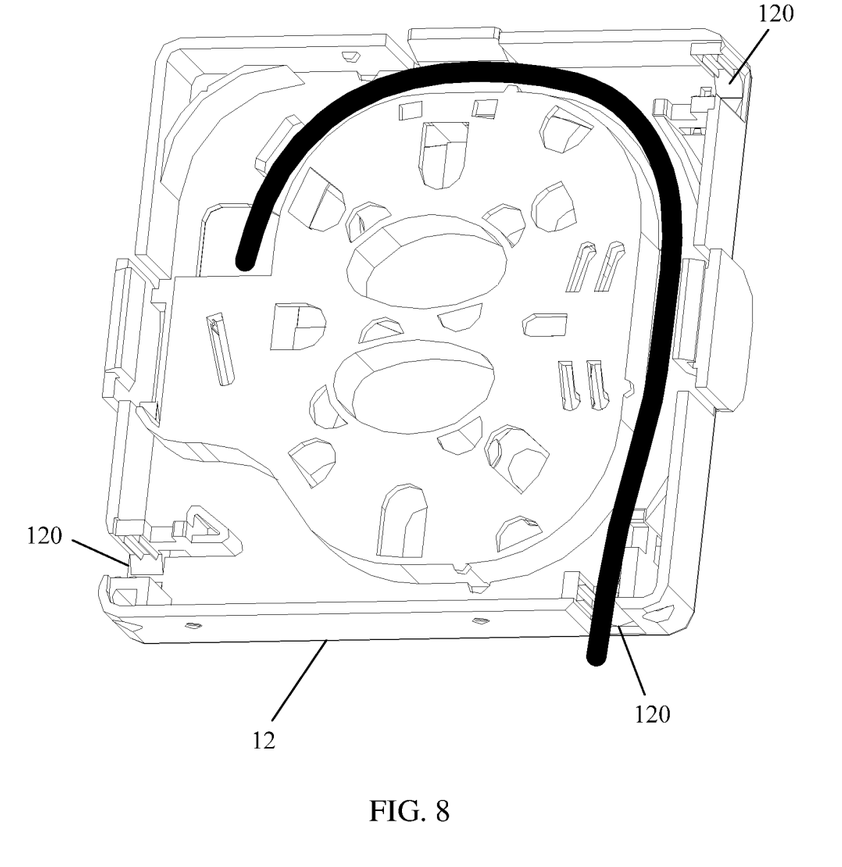
FIG. 8 is a schematic structural diagram of a bottom layer of a base (including an optical cable) of an access terminal box according to an embodiment of the present disclosure.

As shown in FIG. 4, a cable leading-in hole 120 is disposed on the base 12, an optical cable enters the base 12 through the cable leading-in hole 120, a fiber separated from the optical cable is coiled inside a first coiling slot 121 (shown in FIG. 6 and FIG. 7) disposed on the base 12 and is spliced with one end of a pigtail 17 (shown in FIG. 2), the pigtail 17 is coiled inside a second coiling slot 122 (shown in FIG. 6 and FIG. 7) disposed on the base 12, and the other end of the pigtail 17 is connected to the adapter 13. As shown in FIG. 8, the fastening plate 14 is fastened at a top layer of the base 12, the first coiling slot 121 and the second coiling slot 122 are fastened at a middle layer of the base 12, and the optical cable enters a bottom layer of the base 12 through the cable leading-in hole 120. In this embodiment of the present disclosure, three-dimensional space of the base 12 is fully utilized, the fastening plate 14 is fastened at a top layer of the base 12, the first coiling slot 121 and the second coiling slot 122 are fastened at a middle layer of the base 12, and an optical cable enters a bottom layer of the base 12 through the cable leading-in hole 120, such that the space of the base 12 is more compact, and a volume of the access terminal box 10 is reduced.

Figure 6:
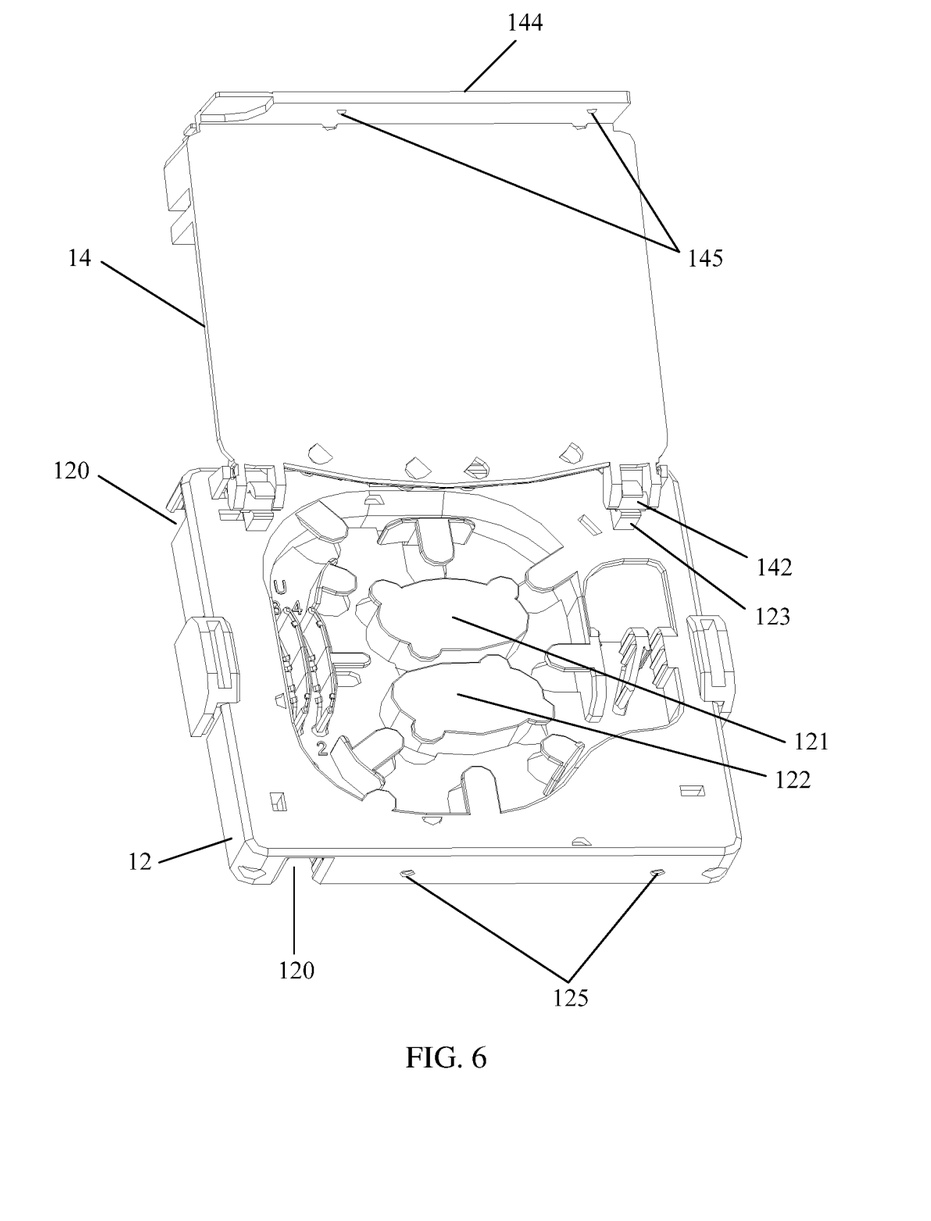
FIG. 6 is a schematic diagram of a three-dimensional structure of a fastening plate and a base (excluding an optical cable and a fiber) obtained after flipping.

As shown in FIG. 6, a fastening shaft 142 is disposed on a side of the fastening plate 14, a fastening slot 123 for fastening the fastening shaft 142 is correspondingly disposed on the base 12, and the fastening plate 14 is connected to the base 12 in a movably fastened manner using the fastening slot 123. Using the foregoing structure design, the fastening plate 14 may flip at the top layer of the base 12, and the first coiling slot 121 and the second coiling slot 122 are disposed at a lower layer of the fastening plate 14. As shown in FIG. 7, after the fastening plate 14 flips, the first coiling slot 121 and the second coiling slot 122 are exposed, facilitating coiling and maintenance of the fiber (the black thick line in the figure).

Figure 5:
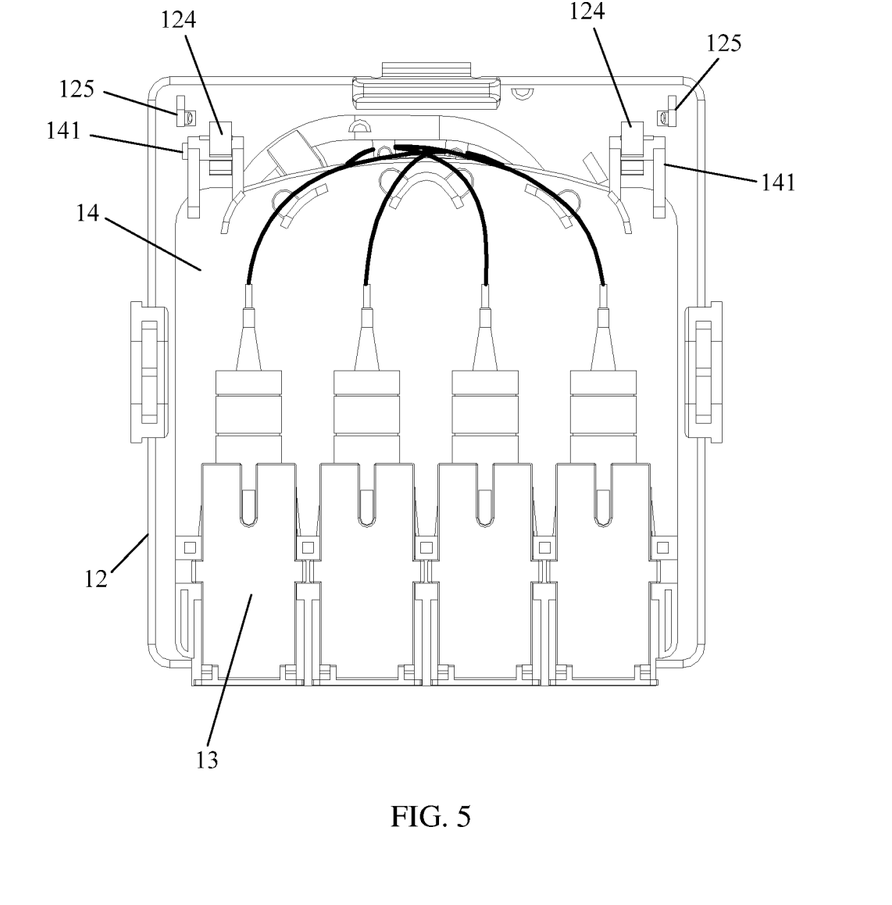
FIG. 5 is a top view of the base of the access terminal box shown in FIG. 3.

As shown in FIG. 4 and FIG. 5, a first fastening part 124 (there are two shown in FIG. 5) is further disposed on the base 12, a second fastening part 143 (shown in FIG. 9) is correspondingly disposed on the fastening plate 14, and when the fastening plate 14 and the base 12 are opened and the fastening plate 14 flips by 180 degrees, the first fastening part 124 is connected to the second fastening part 143 in a fastened manner, such that the fastening plate 14 and the base 12 remain unchanged and are stilled connected. Preferably, the first fastening part 124 is a fastener, and the second fastening part 143 is a locking slot; or the first fastening part 124 is a locking slot, and the second fastening part 143 is a fastener. In particular, when the access terminal box 10 is vertically fastened on a wall or a cabinet, after the fastening plate 14 flips, the first fastening part 124 is connected to the second fastening part 143 in a fastened manner, such that the fastening plate 14 maintains in an open state, facilitating coiling and splicing of the fiber.

As shown in FIG. 4, FIG. 6, and FIG. 7, an edge of a side extends to a side wall of the base 12 to form an extension part 144, where the side is opposite to a side that is of the fastening plate 14 and on which the fastening shaft 142 is disposed, a third fastening part 145 (there are two shown in FIG. 6) is disposed on an inner side surface of the extension part 144, a fourth fastening part 125 (there are two shown in the figures) is correspondingly disposed on a side wall of the base 12, and when the fastening plate 14 and the base 12 are closed, the third fastening part 145 is connected to the fourth fastening part 125 in a fastened manner. Preferably, the third fastening part 145 is a fastener, and the fourth fastening part 125 is a locking slot; or the third fastening part 145 is a locking slot, and the fourth fastening part 125 is a fastener. When the fastening plate 14 and the base 12 are closed, the third fastening part 145 and the fourth fastening part 125 enable the fastening plate 14 and the base 12 to be compactly closed, such that the fastening plate 14 is not randomly separated from the base 12.

Figure 9:
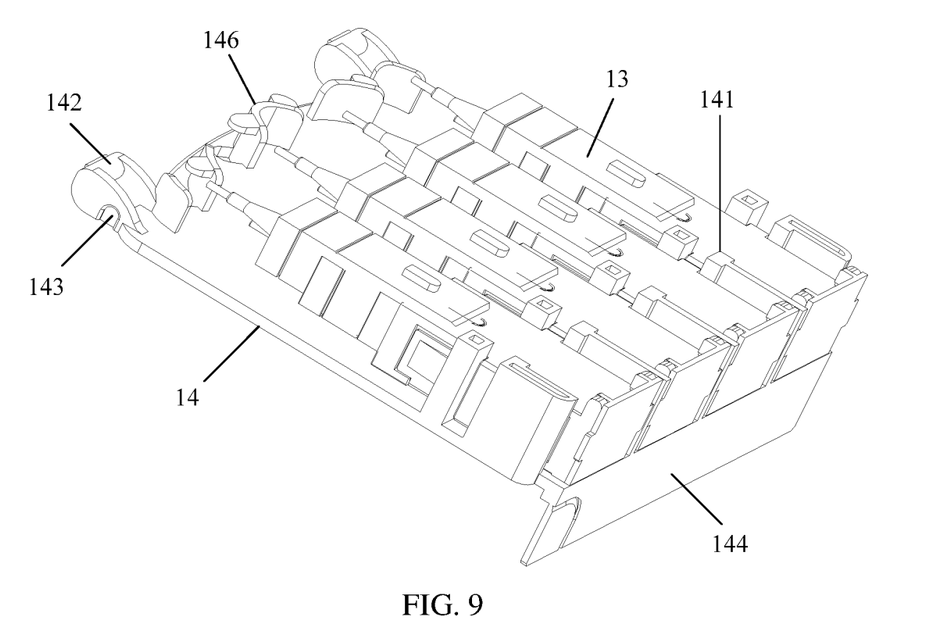
FIG. 9 is a schematic diagram of a three-dimensional structure of a fastening plate of an access terminal box according to an embodiment of the present disclosure.

As shown in FIG. 9, multiple evenly distributed cable claws 146 are disposed in an area between the fastening shafts 142 of the fastening plate 14. The cable claws 146 separate the pigtails 17 (shown in FIG. 2) connected to the adapters 13, and also avoid random motion of the pigtails 17, which ensures that the pigtails 17 are fastened to the adapters 13, and reduces a risk of separation of the pigtails 17 from the adapters 13.

In this embodiment of the present disclosure, the fastening plate 14 is disposed, and the adapter 13 is separately mounted on the fastening plate 14. In addition, three-dimensional space of the base 12 is fully utilized, the fastening plate 14 is fastened at a top layer of the base 12, the first coiling slot 121 and the second coiling slot 122 are fastened at a middle layer of the base 12, and an optical cable enters a bottom layer of the base 12 through the cable leading-in hole 120, such that the space of the base 12 is more compact, and a volume of the access terminal box 10 is reduced.

The foregoing descriptions are merely exemplary implementation manners of the present disclosure, but are not intended to limit the protection scope of the present disclosure. It should be noted that a person of ordinary skill in the art may make some improvements and polishing without departing from the principle of the present disclosure and the improvements and polishing shall fall within the protection scope of the present disclosure.

What is claimed is:

1. An access terminal box, comprising:
a protective cover;
a base;
an adapter;
a fastening plate having a first side and a second side opposite the first side;
a base plate;
a fastening shaft disposed on the first side of the fastening plate;
a second fastening slot correspondingly disposed on the base for fastening the fastening shaft;
a first fastening part disposed on the base;
a second fastening part correspondingly disposed on the fastening plate, wherein an edge of the second side of the fastening plate extends to a side wall of the base to form an extension part;
a third fastening part disposed on an inner side surface of the extension part;
a fourth fastening part correspondingly disposed on the side wall of the base,
wherein the base is fastened on the base plate,
wherein the fastening plate is fastened on the base,
wherein the protective cover is fastened on the base and covers the fastening plate,
wherein a first fastening slot is disposed on the fastening plate,
wherein the adapter is fastened inside the first fastening slot, and
wherein the fastening plate is connected to the base in a movably fastened manner using the second fastening slot.

2. The access terminal box according to claim 1, wherein a cable leading-in hole is disposed on the base, wherein an optical cable enters the base through the cable leading-in hole, wherein a fiber separated from the optical cable is coiled inside a first coiling slot disposed on the base and is spliced with one end of a pigtail, wherein the pigtail is coiled inside a second coiling slot disposed on the base, and wherein another end of the pigtail is connected to the adapter.

3. The access terminal box according to claim 2, wherein the fastening plate is fastened at a top layer of the base, wherein the first coiling slot and the second coiling slot are fastened at a middle layer of the base, and wherein the optical cable enters a bottom layer of the base through the cable leading-in hole.

4. The access terminal box according to claim 3, wherein, when the fastening plate and the base are opened and the fastening plate flips by 180 degrees, the first fastening part is connected to the second fastening part in a fastened manner.

5. The access terminal box according to claim 4, wherein the first fastening part is a fastener and the second fastening part is a locking slot.

6. The access terminal box according to claim 4, wherein the first fastening part is a locking slot and the second fastening part is a fastener.

7. The access terminal box according to claim 4, wherein, when the fastening plate and the base are closed, the third fastening part is connected to the fourth fastening part in a fastened manner.

8. The access terminal box according to claim 7, wherein the third fastening part is a fastener and the fourth fastening part is a locking slot.

9. The access terminal box according to claim 7, wherein the third fastening part is a locking slot and the fourth fastening part is a fastener.

10. The access terminal box according to claim 7, wherein there are two fastening shafts, two second fastening slots, two first fastening parts, two second fastening parts, two third fastening parts, and two fourth fastening parts.

11. The access terminal box according to claim 3, wherein multiple evenly distributed cable claws are disposed in an area between the fastening shafts of the fastening plate.

* * * * *

UNITED STATES PATENT AND TRADEMARK OFFICE
CERTIFICATE OF CORRECTION

PATENT NO.        : 9,733,445 B2
APPLICATION NO.   : 15/147687
DATED             : August 15, 2017
INVENTOR(S)       : Deyi Shi, Yeren Wang and Anliang Yang

Page 1 of 1

It is certified that error appears in the above-identified patent and that said Letters Patent is hereby corrected as shown below:

On the Title Page

Page 2, item (56) Other Publications should read:
Foreign Communication From A Counterpart Application, PCT Application No. PCT/CN2015/078551, Written Opinion dated February 15, 2016, 5 pages.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*